United States Patent
Bledsoe et al.

(10) Patent No.: US 9,237,250 B1
(45) Date of Patent: Jan. 12, 2016

(54) IMAGE PROCESSING APPARATUS WITH SYMMETRIC PROCESSORS

(71) Applicant: Marvell International Technology Ltd., Hamilton (BM)

(72) Inventors: J. Daren Bledsoe, Corvallis, OR (US); Gregory F. Carlson, Corvallis, OR (US); Todd A. McClelland, Corvallis, OR (US); Patrick A. McKinley, Corvallis, OR (US)

(73) Assignee: Marvell International Technology Ltd., Hamilton (BM)

( * ) Notice: Subject to any disclaimer, the term of this patent is extended or adjusted under 35 U.S.C. 154(b) by 0 days.

(21) Appl. No.: 14/200,859

(22) Filed: Mar. 7, 2014

Related U.S. Application Data

(63) Continuation of application No. 10/915,006, filed on Aug. 9, 2004, now Pat. No. 8,699,055.

(51) Int. Cl.
*H04N 1/00* (2006.01)
*H04N 1/32* (2006.01)

(52) U.S. Cl.
CPC .......... *H04N 1/0096* (2013.01); *H04N 1/00236* (2013.01); *H04N 1/00238* (2013.01); *H04N 1/00241* (2013.01); *H04N 1/32598* (2013.01); *H04N 2201/0094* (2013.01)

(58) Field of Classification Search
CPC .......... H04N 1/00236; H04N 1/00238; H04N 1/00241; H04N 1/0096; H04N 1/32598; H04N 2201/0094
USPC .......................................... 358/1.1, 1.15, 2.1
See application file for complete search history.

(56) References Cited

U.S. PATENT DOCUMENTS

| | | | |
|---|---|---|---|
| 6,661,534 B1 * | 12/2003 | Ravi et al. ....................... | 358/1.9 |
| 2001/0033392 A1 * | 10/2001 | Utsunomiya ................ | 358/1.15 |
| 2004/0246502 A1 * | 12/2004 | Jacobsen et al. ............... | 358/1.1 |

* cited by examiner

*Primary Examiner* — Iriana Cruz

(57) ABSTRACT

A multifunction image processing apparatus is disclosed. The apparatus includes a communications module, a scan subsystem, a print subsystem, and a digital signal processor (DSP) block. The communications module is used to communicate with a host computer to send and receive image data files. The scan subsystem is used to scan images. The print subsystem is used to print images. The DSP block includes at least two digital signal processors. The digital signal processors can be programmed to symmetrically multiprocess portions of an image data file to process it more quickly. Alternatively, digital signal processors can be programmed to simultaneously process the image data for the scan subsystem and image data for the print subsystem.

20 Claims, 2 Drawing Sheets

IMAGE PROCESSING APPARATUS WITH SYMMETRIC PROCESSORS

RELATED APPLICATIONS

This application is a continuation of U.S. application Ser. No. 10/915,006, filed on Aug. 9, 2004, which is hereby incorporated by reference in its entirety.

BACKGROUND

The present invention relates to image processing systems, and more particularly, to a multifunction printer, copier, and scanners.

Increasing number of documents, pictures, and other forms of information (generically refer herein to as a "document") are scanned, stored, printed, copied, and otherwise processed as digital format, each document represented and processed as digital image data. In addition, these documents are processed at ever-increasing resolution to capture and reproduce detailed information about the document.

To perform these operations (such as scanning, printing, and copying) many different apparatuses and systems are available in the marketplace. For example, FIG. 1 illustrates a multifunction printer (MFP) 10 designed to perform these operations. The MFP 10 includes a scan subsystem 20 for scanning documents to generate a scan image data 22 and a print subsystem 30 for printing print image data 32 on paper. The scan subsystem 20 and the print subsystem 30 are connected to a processor 40 which processes the scan image data 22 and print image data 32 as well as to control the operations of the scan subsystem 20 and the print subsystem 30. The processor 40 is also connected to a communications module 50 which manages communications of the MFP 10 with a host computer 60. Here, the connections between various components of the MFP 10 are realized using a system bus 12.

The MFP 10 can function as a scanner by scanning a document to generate a scan image data 22, processing the scan image data 22 to generate a scan data file 24, and sending the scan data file 24 to the host computer 60. The MFP 10 can function as a printing by receiving a print data file 34 from the host computer 60, processing the scan data file 34 to generate a print image data 32, and printing the print image data 32. The MFP 10 can function as a copier by first scanning a document to generate a scan image data 22, processing the scan image data 32 to generate a print image data 32, and printing the print image data 22. The scan image data 22, the print image data 32, the scan data file 24, and the print data file 34 arrives at the processor 40 as a data stream and leaves the processor 40 as a processed data stream.

For each of these operations, the processor 40 performs various operations on the image data and the data files. For example, the print data file 34 from the host computer is encoded in a page description language encoding the layout of the page described therein including, for example, fonts, text, and graphics. The processor 40 processes the print data file 34 by performing various operations, for example, font substitution, rotating, edge sharpening, and dithering. Further, the print data file 34 may include RGB (red, green, and blue) color encoding. In that case, the processor 40 needs to perform color space conversion to negative colors of cyan, magenta, yellow, and black and color reinforcement. This is because most printers utilize negative color space CMYK (cyan, magenta, yellow, and black) while most displace devices and computer files utilize positive color space (red, green, and blue).

The processor 40 performs these and other operations for each scan image data 22 and print data file 34. As the resolution of the documents increase and the speed of the scan subsystem 20 and the print subsystem 30 increases, the processor 40 is required to process increasing amounts of data. For example, if a letter size paper (8.5 inches by 11 inches) is scanned at 600 dpi (dots per inch), the total number of pixel positions is 33,660,000 (calculated as 600×600×8.5×11) for a single page of the document. For RGB color information, it is common to use 36 bits for each pixel position (12 bits for each of the three colors). Thus, a single page of color document can scan into a scan image data 22 having size of approximately 151.2 Megabytes (MB) (calculated as 33,600,000×36/8). The processor 40 needs to process this amount of data within several seconds or less.

In the current art, the processor 40 is typically implemented using a general purpose processor programmed to control the subsystems 20 and 30 as well as to process the data streams 22, 24, 32 and 34. As the scan subsystem 20, the print subsystem 30, and the communication module 50 are improved to handle the ever-increasing amounts of data at ever-increasing speeds, the processor 40 is becoming the bottleneck at which the data throughput of the entire image processing apparatus 10 is slowed.

Accordingly, there remains a need for an image processing apparatus with improved processing design allow for faster processing of various data streams.

SUMMARY

The need is met by the present invention. In one embodiment of the present invention, an image processing system includes a communications module, a digital signal processor (DSP) block, and a print subsystem. The communications module is adapted to receive a print data file representing an image. The DSP block includes at least two digital signal processors, each DSP adapted to simultaneously operate on a different portion of the image as represented by the print data file to generate a print image data. The print image data is printed by the print subsystem.

In a second embodiment of the present invention, an image processing system includes a communications module, a scan subsystem, a print subsystem, and a digital signal processor (DSP) block. The communications module is adapted to receive a print data file representing an image. The scan subsystem is adapted to scan a scan image to generate a scan image data. The print subsystem is adapted to print an image, the image represented by print image data. The digital signal processor (DSP) block includes a plurality of digital signal processors where a first digital signal processor is adapted to process the scan image data to generate a scan data file and a second digital signal processor is adapted to process a print data file to generate the print image data.

In a third embodiment of the present invention, a method of processing image data is disclosed. Firstly, a first portion of the image data is allocated to a first digital signal processor for processing and a second portion of the image data is allocated to a second digital signal processor for processing. The allocated portions of the image data are processed simultaneously. Then, the processed portions of the image data are combined.

Other aspects and advantages of the present invention will become apparent from the following detailed description, taken in conjunction with the accompanying drawings, illustrating by way of example the principles of the invention.

DETAILED DESCRIPTION

The present invention will now be described with reference to the FIGS. 1 through 4, which illustrate various embodiments of the present invention. In the Figures, some sizes of structures or portions may be exaggerated relative to sizes of other structures or portions for illustrative purposes and, thus, are provided to illustrate the general structures of the present invention. Furthermore, various aspects of the present invention are described with reference to a structure or a portion positioned "on" or "above" relative to other structures, portions, or both. As will be appreciated by those of skill in the art, relative terms and phrases such as "on" or "above" are used herein to describe one structure's or portion's relationship to another structure or portion as illustrated in the Figures. It will be understood that such relative terms are intended to encompass different orientations of the device in addition to the orientation depicted in the Figures. For example, if the device in the Figures is turned over, rotated, or both, the structure or the portion described as "on" or "above" other structures or portions would now be oriented "below," "under," "in front of," "behind," or "beside" the other structures or portions. Like numbers refer to like elements throughout.

As shown in the Figures for the purposes of illustration, embodiments of the present invention are exemplified by an image processing system having a print subsystem adapted to print an image, the image represented by print image data; and a digital signal processor (DSP) block having at least two digital signal processors. Each of the digital signal processors are adapted to operate, simultaneously with the other digital processors, on a different portion of the image data such that the entire image is processed at the same time. Because two, four, or more digital signal processors are used in symmetric multiprocessing mode, large amount of image data is processed quickly.

Figure 1:
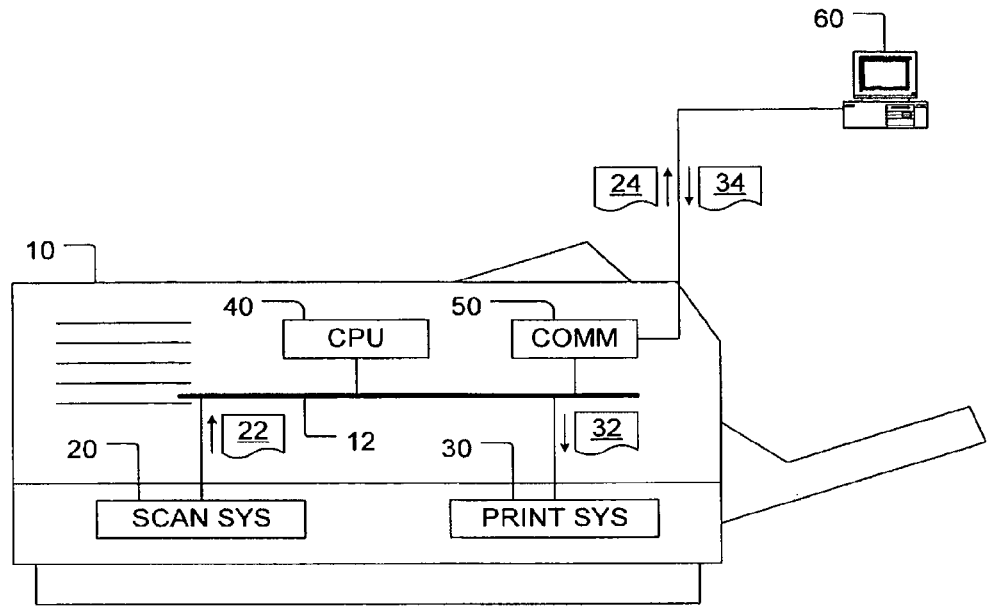
FIG. 1 is a simplified diagram of a prior art image processing apparatus.
Figure 2:
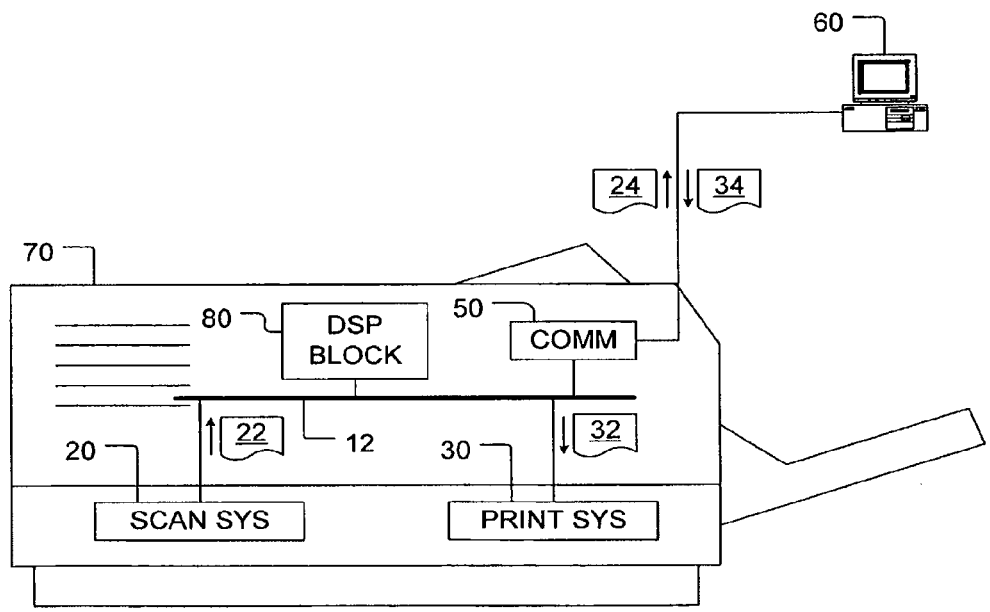
FIG. 2 is a simplified diagram of an image processing apparatus in accordance with one embodiment of the present invention.

FIG. 2 is a simplified diagram of an image processing apparatus 70 in accordance with one embodiment of the present invention. The image processing apparatus 70 include components that are similar to corresponding components of the image processing apparatus 10 of FIG. 1. For convenience, components in FIG. 2 that are similar to corresponding components in FIG. 1 are assigned the same reference numerals and different components are assigned different reference numerals.

Figure 3:
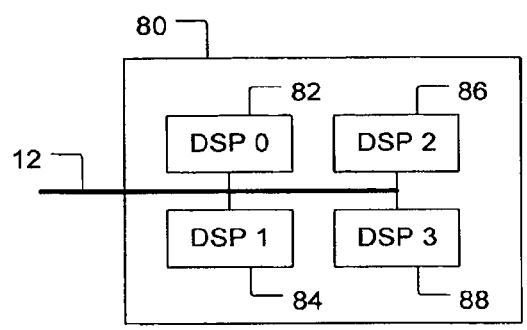
FIG. 3 is a more detailed view of a portion of the image processing apparatus of FIG. 2.

Referring to FIG. 2, the image processing apparatus 70 includes a scan subsystem 20 adapted to scan a document, a scan image, to generate a scan image data 22, a print subsystem 30 adapted to print image data 32 on paper, and a communication module 50 adapted communicate with a host computer 60 in transmitting scanned data files 24 and receiving print data files 34 as well as other control signals. The scan subsystem 20, the print subsystem 30, and the communications module 60 are connected to a digital signal processor (DSP) block 80 via a system bus 12. The DSP block 80 is illustrated in more detail in FIG. 3. Referring to FIGS. 2 and 3, the DSP block 80 includes at least two digital signal processors. In the illustrated embodiment, the DSP block 80 includes four digital signal processors 82 (first DSP), 84 (second DSP), 86 (third DSP), and 88 (fourth DSP), all connected to a system bus 12.

To print a file, the host computer 60 sends an image to be printed by sending a print data file 34 representing the image. The print data file 34, representing the image to be printed, is received by the communications module 50 and forwarded to the DSP block 80. Each of the digital signal processors 82, 84, 86, and 88 of the DSP block 80 is adapted to simultaneously operate on a different portion of the image as represented by the print data file 34 to generate a print image data 32. The print image data 32 is sent to the print subsystem 30 to print the image presented by the print image data 32 which is also the image represented by print data file 34.

To process the print data file 34 from a host computer 60, a first portion (for instance, top portion) of the print data file 34 is allocated to the first digital signal processor 82 and a second portion (for instance, bottom portion) of the print data file 34 is allocated to a second digital signal processor 84 for symmetric simultaneous processing. Following the symmetric processing of the portions, the processed portions are combined to form the print image data 32.

In fact, the print data file 34 can be parsed into even smaller portions (four portions in the current example), each portion allocated to one of the available digital signal processors (four digital signal processors in the current example) for more efficient processing. In alternate configuration, the DSP block 80 can include greater number of digital signal processors, each digital signal processor adapted to operate on a portion of the print data file 34 such that the entire print data file is processed more quickly compared to the time required to process the print image data 34 using a single general purpose processor 40 of FIG. 1.

Figure 4:
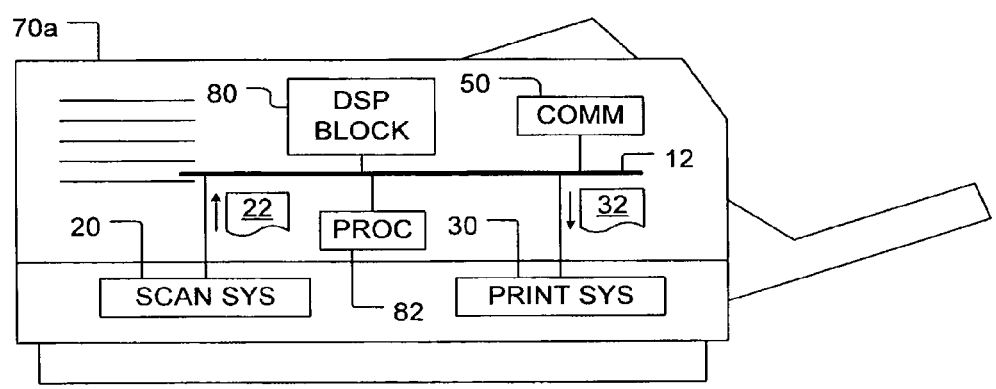
FIG. 4 is a simplified diagram of an image processing apparatus in accordance with another embodiment of the present invention.

One of the digital signal processors, for example the first digital signal processor 82 can be adapted and configured to divide the print data file 34 into smaller portions and to allocate the divided portions to the various digital signal processors including for example be adapted itself and the other digital signal processors of the DSP block 80. Alternatively, a control processor connected to the DSP block 80 can be used to divide the print data file 34 into smaller portions and to allocate the divided portions to the various digital signal processors of the DSP block 80. This alternative configuration is illustrated as the image processing apparatus 70a of FIG. 4. In FIG. 4, the control processor is designated with reference numeral 82. The image processing apparatus 70a of FIG. 4 is identical to the image processing apparatus 70 of FIG. 2 but for the addition of the control processor 82.

Referring again to FIGS. 2 and 3, the image processing apparatus 70 includes a scan subsystem 20 adapted to scan an image to generate scan image data 22, the scan image data representing the scanned image. The scan subsystem 20 is connected to the DSP block 80 via the system bus 12. Similar to the print data file 34, the scan image data 22 is divided into portions each of which can be simultaneously processed by the digital signal processors 82, 84, 86, and 88 of the DSP block 80 for symmetric processing to increase the throughput of the image processing apparatus 70. Following the symmetric processing of the portions, the processed portions are combined to form the scan data file 24. Here, to process portions of the scan image data 22, each of the digital signal processors 82, 84, 86, and 88 of the DSP block 80 is adapted to operate on a portion of the scan image data 22 such that the entire scan image data is processed.

One of the digital signal processors, the first digital signal processor 82 can and configured to divide the scan image data 22 into smaller portions and to allocate the divided portions to the various digital signal processors including itself and the other digital signal processors of the DSP block 80. Alternatively, the control processor 82 of FIG. 4 connected to the DSP block 80 can be used to divide the scan image data 22 into smaller portions and to allocate the divided portions to the various digital signal processors of the DSP block 80. Again, this alternative configuration is illustrated as the image processing apparatus 70*a* of FIG. 4.

Again referring to FIGS. 2 and 3, both the scan subsystem 20 and the print subsystem 30 of the image processing apparatus 70 can operate simultaneous with the digital signal processors 82, 84, 86, and 88 of the DSP block 80. In that mode, the scan image data 22 is allocated to the first digital signal processor 82 for processing while the print data file 34 is allocated to the second digital signal processor 84 for processing. Alternately, processing of the scan image data 22 can be symmetrically performed by the first and the third digital signal processors 82 and 86 while processing of the print data file 34 can be symmetrically performed by the second and the fourth digital signal processors 84 and 88. By using the digital signal processors 82, 84, 86, and 88 of the DSP block 80 to process different data streams, the image processing apparatus 70 can scan and print simultaneously.

For simultaneous operation of the scan subsystem 20 and the print subsystem 30, one of the digital signal processors, for example the first digital signal processor 82 can be adapted and configured to allocate the scan image data 22 to the first digital signal processor 82 and to allocate the print data file 34 to the second digital signal processor 84. Alternatively, the control processor 82 of FIG. 4 connected to the DSP block 80 can be adapted to allocate the scan image data 22 to the first digital signal processor 82 and to allocate the print data file 34 to a second digital signal processor 84.

As illustrated, the DSP block 80 including its digital signal processors 82, 84, 86, and 88 is fabricated on a single integrated circuit chip. The image processing apparatus 70 can be, for example, a scanner, a copier, or a multifunction printer (MFP). A number of DSP blocks are available in the marketplace, for example, models CW4011/CW4511/CW4512 of ChipWrights, Inc. of Waltham, Mass., or models SP-3/SP-5/SP-5Flex of 3DSP Corporation of Irvine, Calif. For the control processor 82, the following models are available from the marketplace: models ARM946/ARM1026EJ-S/ARM1156T2(F)-S from ARM, Inc. of Austin, Tex.; models MIP5KF/MIPS 20KC/MIPS24KF from MIPS Technologies, Inc. of Mountain View, Calif.; and models ColdFire MCF5xxx/MCF5232/MCF5233 Series from Motorola, Inc. of Schaumburg, Ill.

To process the scan image data 22 and the print data file 34, the DSP block 80 including its digital signal processors 82, 84, 86, and 88 can perform various operations on the data and the data file. For example only, the processing functions can include font substitution, rotating, edge sharpening, dithering, color space conversion, and color reinforcement.

From the foregoing, it will be apparent that the present invention is novel and offers advantages over the current art. Although specific embodiments of the invention are described and illustrated above, the invention is not to be limited to the specific forms or arrangements of parts so described and illustrated. The invention is limited by the claims that follow.

What is claimed is:

1. A multifunction printing system comprising:
   first, second and third processors configured to perform image processing operations;
   a printing subsystem in communication with at least one of the first, second, and third processors; and
   a scanning subsystem in communication with at least one of the first, second, and third processors,
   wherein during a print operation, the first processor is configured to assign different portions of print image data representing an image to be printed to itself and one or more of the second and third processors to concurrently execute image processing operations on different portions of the print image data to generate print output data to be communicated to the printing subsystem;
   wherein during a scan operation, one or more of the first, second, and third processors is configured to receive scan image data representing a scanned image from the scanning subsystem, and the first processor is configured to assign different portions of the scan image data to itself and one or more of the second and third processors to concurrently execute image processing operations on different portions of the scan image data to generate scan output data to be communicated to a host system;
   wherein during simultaneous print and scan operations, the first processor assigns at least a portion of the print image data to the second processor and assigns at least a portion of the scan image data to the third processor to facilitate simultaneous image processing operations on both the print image data and the scan image data to concurrently generate the print output data and the scan output data; and
   wherein during the print operations, the image processing operations performed by one or more of the first second and third processors convert the print image data to print output data suitable for processing by the printing system, and during the scan operations the image processing operations convert the scan image data to scan output data suitable for processing by the host system.

2. The multifunction printing system of claim 1, wherein the first, second, and third processors are formed in a single integrated circuit.

3. The multifunction printing system of claim 1, wherein the second and third processors are digital signal processors (DSPs).

4. The multifunction printing system of claim 3, wherein the first processor is a digital signal processor (DSP).

5. The multifunction printing system of claim 1, wherein the first processor is a master processor.

6. The multifunction printing system of claim 1, wherein the image processing operations are selected from the group of image processing operations consisting of font substitution, edge sharpening, pixel dithering, color space conversion, and color reinforcement.

7. An integrated circuit comprising:
   first, second and third processors configured to perform image processing operations, wherein at least one of the first, second, and third processors is in communication with a data bus;
   wherein during a print operation one or more of the first, second, and third processors is configured to receive print image data representing an image to be printed from the data bus, and the first processor is configured to assign different portions of the print image data to itself and one or more of the second and third processors to concurrently execute image processing operations on the different portions of the print image data to generate print output data to be communicated on the data bus;
   wherein during a scan operation, one or more of the first, second, and third processors is configured to receive scan image data representing a scanned image from the data bus, and the first processor is configured to assign different portions of the scan image data to itself and one or more of the second and third processors to concurrently execute image processing operations on the different portions of the scan image data to generate scan output data to be communicated on the data bus;

wherein during simultaneous print and scan operations, the first processor assigns at least a portion of the print image data to the second processor and assigns at least a portion of the scan image data to the third processor to facilitate simultaneous image processing operations on both the print image data and the scan image data to concurrently generate the print output data and the scan output data; and wherein during the print operations, the image processing operations performed by one or more of the first second and third processors convert the print image data to print output data suitable for processing by the printing system, and during the scan operations the image processing operations convert the scan image data to scan output data suitable for processing by the host system.

8. The integrated circuit of claim 7, wherein the first, second, and third processors are formed in a single integrated circuit.

9. The integrated circuit of claim 7, wherein the second and third processors are digital signal processors (DSPs).

10. The integrated circuit of claim 9, wherein the first processor is digital signal processor (DSP).

11. The integrated circuit of claim 7, wherein the first processor is a master processor.

12. The integrated circuit of claim 7, wherein the print output data is communicated to a printing subsystem that is in communication with the data bus, and the scan output data is communicated to a scanning subsystem that is in communication with the data bus.

13. The integrated circuit of claim 7, wherein the image processing operations are selected from the group of image processing operations consisting of font substitution, edge sharpening, pixel dithering, color space conversion, and color reinforcement.

14. A method for processing print image data and scan image data comprising:

communicating print image data during a print operation to a first processor, wherein the print image data represents an image to be printed;

assigning, by the first processor, different portions of the print image data to itself and one or more of a second and a third processor to concurrently execute print image processing operations on the different portions of the print image data to generate print output data, wherein execution of the print image processing operations comprises converting the print image data to print output data suitable for processing by a printing system;

receiving scan image data during a scan operation at the first processor, wherein the scan image data represents a scanned image assigning, by the first processor, different portions of the scan image data to itself and one or more of the second and third processors to concurrently execute scan image processing operations on the different portions of the scan image data to generate scan output data, wherein execution of the scan image processing operations comprises converting the scan image data to scab output data suitable for processing by a host system; and during simultaneous print and scan operations, assigning, by the first processor, at least a portion of the print image data to the second processor and at least a portion of the scan image data to the third processor to facilitate simultaneous image processing operations on both the print image data and the scan image data to concurrently generate the print output data and the scan output data.

15. The method of claim 14, wherein the first, second, and third processors are formed in a single integrated circuit.

16. The method of claim 14, wherein the second and third processors are digital signal processors (DSPs).

17. The method of claim 16, wherein the first processor is digital signal processor (DSP).

18. The method of claim 14, wherein the first processor is a master processor.

19. The method of claim 14, wherein the print output data is communicated to a printing subsystem that is in communication with the first processor, and the scan output data is communicated to a scanning subsystem that is in communication with the first processor.

20. The method of claim 14, wherein the image processing operations are selected from the group of image processing operations consisting of font substitution, edge sharpening, pixel dithering, color space conversion, and color reinforcement.

* * * * *